United States Patent [19]
Babb et al.

[11] Patent Number: 4,621,403
[45] Date of Patent: Nov. 11, 1986

[54] APPARATUS AND METHOD FOR INSERTING COILED TUBING

[75] Inventors: Richard C. Babb, Houston, Tex.; Tommy K. Griffin, Lafayette, La.

[73] Assignee: Hughes Tool Company, Houston, Tex.

[21] Appl. No.: 611,648

[22] Filed: May 18, 1984

[51] Int. Cl.⁴ .............. B23P 19/04; E21B 23/00; E21B 31/00; F16L 55/00
[52] U.S. Cl. .............................. 29/433; 29/241; 29/700; 166/77; 285/18
[58] Field of Search ............. 29/241, 433, 464, 465, 29/466, 468, 469, 700, 781; 166/75, 77, 91, 384, 237; 285/142, 18

[56] References Cited

U.S. PATENT DOCUMENTS

| | | | |
|---|---|---|---|
| 3,134,613 | 5/1964 | Regan | 285/142 |
| 3,147,992 | 9/1964 | Haeber et al. | 285/18 |
| 3,241,864 | 3/1966 | Shaffer | 285/18 |
| 3,285,485 | 11/1966 | Slator | 166/75 X |
| 3,313,346 | 4/1967 | Cross | 166/77 X |
| 3,690,136 | 9/1972 | Slator et al. | 166/77 X |
| 3,776,320 | 12/1973 | Brown | 173/163 |
| 3,841,407 | 10/1974 | Bozeman | 166/315 |
| 3,857,450 | 12/1974 | Guier | 175/85 |
| 3,920,076 | 11/1975 | Laky | 166/384 |
| 4,142,740 | 3/1979 | Wilm | 285/18 |
| 4,428,421 | 1/1984 | Rankin | 166/77 |
| 4,477,105 | 10/1984 | Whittman et al. | 285/18 |
| 4,515,220 | 5/1985 | Sizer et al. | 166/384 |

Primary Examiner—Howard N. Goldberg
Assistant Examiner—Ronald S. Wallace
Attorney, Agent, or Firm—H. Dennis Kelly

[57] ABSTRACT

An apparatus and method for inserting coiled tubing into a drill string in an oil well. The apparatus has a coiled tubing injector head, pressure control equipment, and a quick connect coupling. The coupling will connect to a tool joint on the drill string or to a saver sub threaded onto the drill string. The method includes lowering the apparatus until the quick connect coupling latches onto the tool joint or saver sub.

9 Claims, 2 Drawing Figures

APPARATUS AND METHOD FOR INSERTING COILED TUBING

BACKGROUND OF THE INVENTION

1. Field of the Invention:

This invention relates in general to oil well workover operations and, in particular, to the insertion of coiled tubing into a drill string.

2. Description of the Prior Art:

In some types of oil well workover operations, coiled tubing is run into the tubing string or drill string of the oil well. For example, coiled tubing may be used to inject nitrogen into a well in order to test the productivity of a particular zone. When coiled tubing is being inserted into a well, pressure control equipment, such as a blowout preventor stack, is used to prevent a blowout. In the prior art, the pressure control equipment was connected to the drill string by flanging a threaded sub onto the bottom of the pressure control equipment, and then threading the sub into the upper end of the drill string. Such a method required hanging the pressure control equipment from a crane while stabbing and rotating to make up the connection. The operation can be particularly difficult on a floating vessel, due to the relative motion between the crane and the well head. In rough seas, such a connection has been known to take as much as two or three hours to complete.

The apparatus of this invention utilizes a coupling which is an adaption of the quick connect fitting shown in U.S. Pat. No. 3,134,613 (Regan). The Regan coupling was used to connect a shutoff valve to the tubing string of an oil well to prevent a blowout. The coupling allowed the shutoff to be merely slipped over and latched onto the upper end of the tubing string to shut off the fluid flow. The coupling had a tubular housing and a plurality of circumferentially spaced latch elements within the housing. The latch elements were pivotable between inner, extended positions, wherein the latch elements engaged the drill string, and outer, retracted positions. The latch elements had inner cam surfaces engageable with the upper end of the tubing string to pivot the latch elements outwardly into the retracted position as the housing was slipped over the upper end of the tubing string. The coupling also had manual retracting means for pivoting the latch elements into the retracted positions, to cause the latch elements to disengage the tubing string when it was desired to remove the housing from the upper end of the tubing string. The release means of the Regan quick connect fitting was not remotely operable, and the latch elements were not designed to support the entire weight of the tubing string.

It is preferable that an apparatus for inserting coiled tubing into a drill string be remotely releasable. The release means should be remotely operable, because the coupling will be positioned high above the deck of the floating vessel to allow for wave and tidal action. Also, there are times when it is desirable to support the weight of the tubing string with the coupling, so the latch elements or dogs should be designed to support such weight.

SUMMARY OF THE INVENTION

The general object of this invention is to provide an apparatus and a method for inserting coiled tubing into a drill string, in which it is relatively fast and easy to connect the apparatus to the drill string and to disconnect the apparatus from the drill string.

The object of the invention is accomplished by a novel combination which includes a coiled tubing injector head and a quick connect coupling. The quick connect coupling has a tubular housing, adapted to be slipped over the upper end of the drill string, and a plurality of circumferentially spaced dogs within the housing. The dogs are pivotable, between inner, extended positions, wherein the dogs engage the drill string, and outer, retracted positions. The dogs have inner cam surfaces, engageable with the upper end of the drill string, to pivot the dogs outwarldy into the retracted positions as the housing is slipped over the upper end of the drill string. The quick connect coupling also has a remotely operable retracting means for pivoting the dogs into the retracted positions to cause the dogs to disengage the drill string when it is desired to remove the housing from the upper end of the drill string. The apparatus may also include a lifting frame, connected to the quick connect coupling, so that the apparatus can be lifted by conventional derrick equipment.

The method of the invention includes connecting a coiled tubing injector head to a quick connect coupling, the coupling having a tubular housing, a plurality of circumferentially spaced dogs within the housing, and retracting means for pivoting the dogs into retracted positions. The coupling is then lowered onto the upper end of the drill string, so that the drill string engages inner cam surfaces on the dogs to pivot the dogs outwardly into the retracted positions. The coupling is then lowered further onto the drill string, until the dogs pass below a shoulder on the drill and pivot to inner, extended positions to lock the coupling onto the drill string. Finally, the injector head is actuated to push the coiled tubing through the coupling into the drill string.

The above, as well as additional objects, features, and advantages of the invention, will become apparent in the following detailed description.

DESCRIPTION OF THE PREFERRED EMBODIMENT

Figure 1:
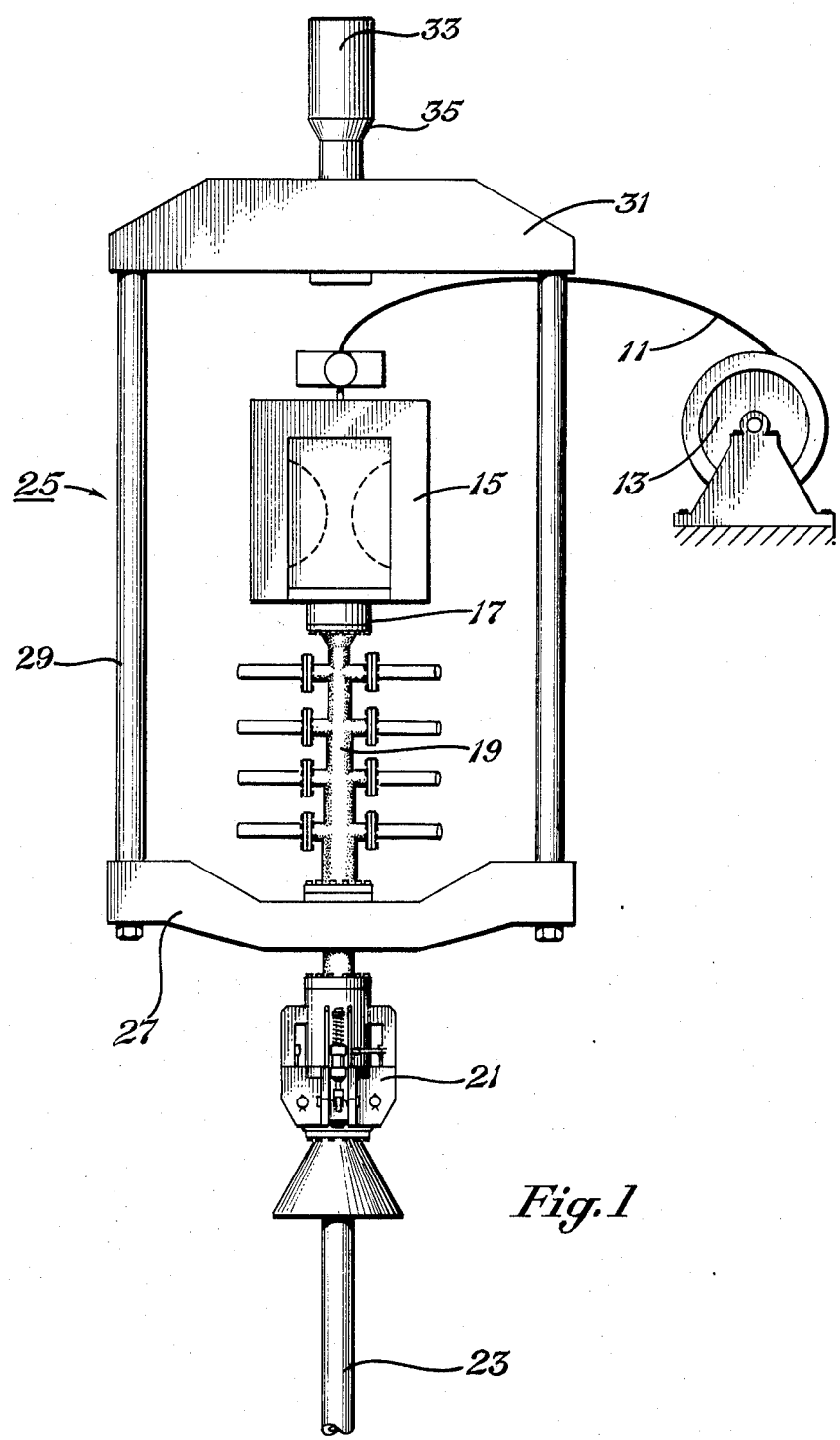
FIG. 1 is a side view of the apparatus of the invention, utilized in the method of the invention.

FIG. 1 illustrates the preferred embodiment of the apparatus of the invention. Coiled tubing 11 is fed from a coiled tubing reel 13 to a coiled tubing injector head 15. The injector head 15 has drive wheels (not shown) to drive the coiled tubing 11. The injector head 15 drives tubing 11 through a stripper rubber 17 connected to the bottom of the injector head. The stripper rubber 17 allows the tubing 11 to pass, but prevents mud from entering the injector head 15.

A blowout preventer stack 19 is attached below the stripper rubber 17. This stack 19 is pressure control equipment to prevent a blowout. After passing through the blowout preventor stack 19, the tubing 11 enters a quick connect coupling 21. The tubing 11 then passes into the drill string 23 down to a selected position in the well.

A lifting frame 25 is connected to the quick connect coupling 21, so that the apparatus can be lifted. The lifting frame 25 has a lower horizontal section 27, a plurality of vertical members 29, and an upper section 31. An upwardly extending lift member 33 extends upward from the upper section 31 and has a downward facing shoulder 35, so that a conventional elevator (not shown) can be attached to the lift member 33. With a conventional elevator attached to the lifting frame 25, the apparatus may be lifted and lowered by means of the conventional travelling equipment in the oil well derrick.

Figure 2:
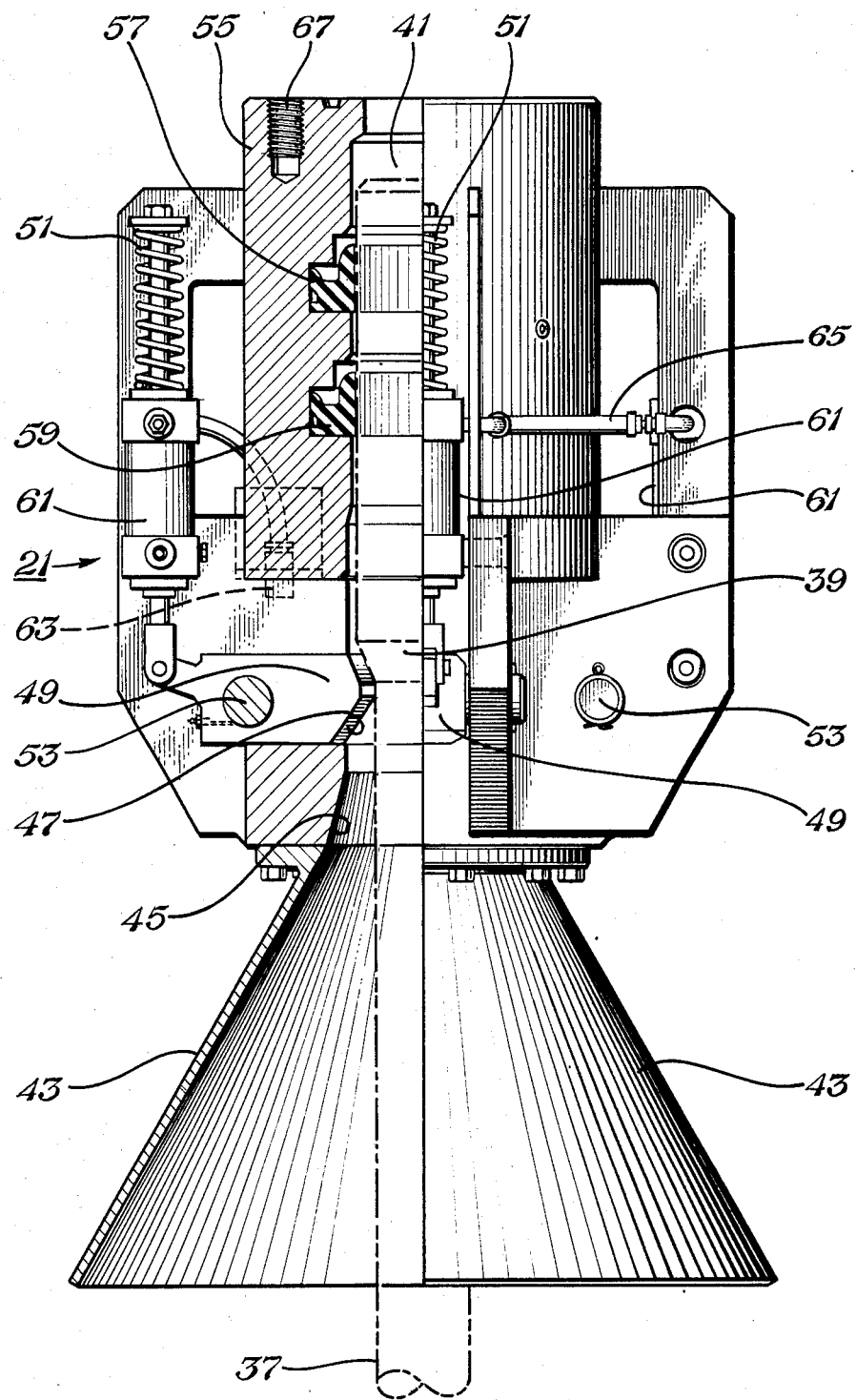
FIG. 2 is a side view, in quarter section, of the quick connect coupling, which is part of the apparatus of the invention.

FIG. 2 illustrates the quick connect coupling 21 of the invention. The coupling 21 connects to the upper tool joint on the drill string 23 or to a specially designed saver sub 37, which is threaded onto the upper end of the drill string 23. The saver sub 37 has a downward facing shoulder 39, which is similar to the downward facing shoulder on a conventional tool joint. The upper end 41 of the saver sub 37 may have a specially constructed smooth surface, to facilitate sealing. The saver sub 37 may also have a specially treated exterior surface to provide for extended wear.

A cone 43 is connected to the bottom of the quick connect coupling 21 to guide the apparatus onto the end of the saver sub 37. As the saver sub 37 enters the mouth 45 of the coupling 21, the upper end of the saver sub engages cam surfaces 47 on a plurality of locking dogs 49. The dogs 49 are biased toward inner, extended positions, as shown in FIG. 2, by a plurality of springs 51. However, as the coupling 21 is lowered onto the saver sub 37, the bias of the springs 51 is overcome, and the dogs 49 pivot about trunnion connections 53 into outward, retracted positions. As the housing 55 of the coupling 21 is lowered further onto the saver sub 37, the dogs 49 pass below the shoulder 39 on the saver sub 37. The springs 51 then urge the dogs 49 to return to the inner, extended positions shown in FIG. 2. Also, as the housing 55 is lowered onto the saver sub 37, the upper end 41 of the saver sub engages a pair of elastomeric seals 57, 59, which form seals between the housing 55 and the saver sub 37.

A fluid cylinder 61 is attached to each dog 49. As fluid pressure is applied through an inlet 63, and through a manifold 65 to each of the fluid cylinders 61, the fluid cylinders 61 cause the dogs 49 to pivot to the outer, retracted positions. The fluid cylinders 61 are thus a remotely operable retracting means for pivoting the dogs 49 into the retracted positions to cause the dogs 49 to disengage the saver sub 37 when it is desired to remove the housing 55 from the upper end of the saver sub 37.

The top of the housing 55 has a plurality of stud holes 67 arranged as a standard flange connection, so that the coupling 21 can be connected to the lifting frame 25 or to the pressure control equipment 19.

In operation, the coiled tubing injector head 15 is first connected to the pressure control equipment 19, which is normally a blowout preventor stack. The pressure control equipment 19 is then connected to a quick connect coupling 21, which has a tubular housing 55, a plurality of circumferentially spaced dogs 49 within the housing 55, and a remotely operable fluid cylinder 61 for pivoting the dogs 49 into retracted positions. A specially designed saver sub 37 is then threaded onto the upper end of the drill string 23. The coupling 21 is then lowered onto the upper end of the saver sub 37, so that the saver sub 37 engages inner cam surfaces 47 on the dogs 49 to pivot the dogs 49 outwardly into retracted positions. The coupling 21 is lowered further onto the saver sub 37, until the dogs 49 pass below a shoulder 39 on the saver sub 37 and pivot to inner, extended positions, to lock the coupling 21 onto the saver sub 37. The injector head 15 is then actuated to push the coiled tubing 11 through the pressure control equipment 19, the quick connect coupling 21, and the saver sub 37, into the drill string 23.

The apparatus and the method of the invention have significant advantages over the prior art. The lifting frame 25 provides means by which the apparatus can be lifted by conventional travelling equipment. The apparatus can then be guided down onto the end of the drill string 23 by the cone 43. Once the apparatus has been stabbed onto the end of the drill string 23, the apparatus is connected to the drill string merely by lowering the coupling 21 past a shoulder 39. The specially designed saver sub 37 may be utilized to prevent possible damage to the tool joint on the drill string 23. The apparatus and method of the invention thus reduces the time required to make the connection from a possible two or three hours to a matter of minutes.

While the invention has been shown in only one of its forms, it should be apparent to those skilled in the art that it is not so limited, but is susceptible to various changes and modifications without departing from the spirit thereof.

We claim:

1. An apparatus for inserting coiled tubing into a drill string, comprising:
   a coiled tubing injector head; and
   a quick connect coupling, connected below the coiled tubing injector head, said coupling having a tubular housing adapted to be slipped over the upper end of the drill string, a plurality of circumferentially spaced dogs within the housing and pivotable between inner, extended positions, wherein the dogs engage the drill string, and outer, retracted positions, said dogs having inner cam surfaces engageable with the upper end of the drill string to pivot the dogs outwardly into the retracted positions as the housing is slipped over the upper end of the drill string, and retracting means for pivoting the dogs into the retracted positions to cause the dogs to disengage the drill string when it is desired to remove the housing from the upper end of the drill string.

2. An apparatus for inserting coiled tubing into a drill string, comprising:
   a coiled tubing injector head; and
   pressure control equipment, connected below the coiled tubing injector head; and
   a quick connect coupling, connected below the pressure control equipment, said coupling having a tubular housing adapted to be slipped over the upper end of the drill string, a plurality of circumferentially spaced dogs within the housing and pivotable between inner, extended positions, wherein the dogs engage the drill string, and outer, retracted positions, said dogs having inner cam surfaces engageable with the upper end of the drill string to pivot the dogs outwardly into the retracted positions as the housing is slipped over the upper end of the drill string, and retracting means for pivoting the dogs into the retracted positions to cause the dogs to disengage the drill string when it is desired to remove the housing from the upper end of the drill string.

3. An apparatus for inserting coiled tubing into a drill string, comprising:
   a coiled tubing injector head;
   pressure control equipment, connected below the coiled tubing injector head; and
   a quick connect coupling, connected below the pressure control equipment, said coupling having a tubular housing adapted to be slipped over the upper end of the drill string, a plurality of circumferentially-spaced dogs within the housing and pivotable between inner, extended positions wherein the dogs engage the drill string, and outer, retracted positions, said dogs having inner cam surfaces engageable with the upper end of the drill string to pivot the dogs outwardly into the retracted positions as the housing is slipped over the upper end of the drill string, and retracting means for pivoting the dogs into the retracted positions to cause the dogs to disengage the drill string when it is desired to remove the housing from the upper end of the drill string, said retracting means including a remotely operable fluid cylinder.

4. An apparatus for inserting coiled tubing into a drill string, comprising:
   a coiled tubing injector head;
   pressure control equipment, connected below the coiled tubing injector head;
   a quick connect coupling, connected below the pressure control equipment, said coupling having a tubular housing adapted to be slipped over the upper end of the drill string, a plurality of circumferentially-spaced dogs within the housing and pivotable between inner, extended positions wherein the dogs engage the drill string, and outer, retracted positions, said dogs having inner cam surfaces engageable with the upper end of the drill string to pivot the dogs outwardly into the retracted positions as the housing is slipped over the upper end of the drill string, and retracting means for pivoting the dogs into the retracted positions to cause the dogs to disengage the drill string when it is desired to remove the housing from the upper end of the drill string, said retracting means including a remotely operable fluid cylinder; and
   a lifting frame, connected to the quick connect coupling.

5. An apparatus for inserting coiled tubing into a drill string, comprising:
   a coiled tubing injector head;
   pressure control equipment, connected below the coiled tubing injector head;
   a saver sub, adapted to be threaded onto the upper end of the drill string;
   a quick connect coupling, connected below the pressure control equipment, said coupling having a tubular housing adapted to be slipped over the upper end of the saver sub, a plurality of circumferentially-spaced dogs within the housing and pivotable between inner, extended positions wherein the dogs engage the saver sub, and outer, retracted positions, said dogs having inner cam surfaces engageable with the upper end of the saver sub to pivot the dogs outwardly into the retracted positions as the housing is slipped over the upper end of the saver sub, and retracting means for pivoting the dogs into the retracted positions to cause the dogs to disengage the drill string when it is desired to remove the housing from the upper end of the saver sub, said retracting means including a remotely operable fluid cylinder; and
   a lifting frame, connected to the quick connect coupling.

6. A method of inserting coiled tubing into a drill string, comprising the steps of:
   connecting a coiled tubing injector head to a quick connect coupling, said coupling having a tubular housing, a plurality of circumferentially spaced dogs within the housing, and retracting means for pivoting the dogs into retracted positions;
   lowering the coupling onto the upper end of the drill string, so that the drill string engages inner cam surfaces on the dogs to pivot the dogs outwardly into the retracted positions;
   lowering the coupling further onto the drill string, until the dogs pass below a shoulder on the drill string and pivot to inner extended positions to lock the coupling onto the drill string; and
   actuating the injector head to push the coiled tubing through the coupling into the drill string.

7. A method of inserting coiled tubing into a drill string, comprising the steps of:
   connecting a coiled tubing injector head to pressure control equipment;
   connecting the pressure control equipment to a quick connect coupling, said coupling having a tubular housing, a plurality of circumferentially spaced dogs within the housing, and retracting means for pivoting the dgos into retracted positions;
   lowering the coupling onto the upper end of the drill string, so that the drill string engages inner cam surfaces on the dogs to pivot the dogs outwardly into the retracted positions;
   lowering the coupling further onto the drill string, until the dogs pass below a shoulder on the drill string and pivot to inner extended positions to lock the coupling onto the drill string; and
   actuating the injector head to push the coiled tubing through the pressure control equipment and the coupling into the drill string.

8. A method of inserting coiled tubing into a drill string, comprising the steps of:
   connecting a coiled tubing injector head to pressure control equipment;
   connecting the pressure control equipment to a quick connect coupling, said coupling having a tubular housing, a plurality of circumferentially spaced dogs within the housing, and a remotely operable fluid cylinder for pivoting the dogs into retracted positions;
   lowering the coupling onto the upper end of the drill string, so that the drill string engages inner cam surfaces on the dogs to pivot the dogs outwardly into the retracted positions;
   lowering the coupling further onto the drill string, until the dogs pass below a shoulder on the drill string and pivot to inner extended positions to lock the coupling onto the drill string; and
   actuating the injector head to push the coiled tubing through the pressure control equipment and the coupling into the drill string.

9. A method of inserting coiled tubing into a drill string, comprising the steps of:
   connecting a coiled tubing injector head to pressure control equipment;
   connecting the pressure control equipment to a quick connect coupling, said coupling having a tubular housing, a plurality of circumferentially spaced dogs within the housing, and a remotely operable fluid cylinder for pivoting the dogs into retracted positions;

threading a saver sub onto the upper end of the drill string;

lowering the coupling onto the upper end of the saver sub, so that the saver sub engages inner cam surfaces on the dogs to pivot the dogs outwardly into the retracted positions;

lowering the coupling further onto the saver sub until the dogs pass below a shoulder on the saver sub and pivot to inner extended positions to lock the coupling onto the saver sub; and actuating the injector head to push the coiled tubing through the pressure control equipment, the coupling and the saver sub, into the drill string.

* * * * *